United States Patent
Savant et al.

(10) Patent No.: US 11,366,903 B1
(45) Date of Patent: Jun. 21, 2022

(54) SYSTEMS AND METHODS TO MITIGATE STALKERWARE BY RENDERING IT USELESS

(71) Applicant: Symantec Corporation, Mountain View, CA (US)

(72) Inventors: Anubhav Savant, Culver City, CA (US); Arif Mohammed Shaikh, Pune (IN)

(73) Assignee: NortonLifeLock Inc., Tempe, AZ (US)

( * ) Notice: Subject to any disclaimer, the term of this patent is extended or adjusted under 35 U.S.C. 154(b) by 142 days.

(21) Appl. No.: 16/723,556

(22) Filed: Dec. 20, 2019

(51) Int. Cl.
*G06F 21/56* (2013.01)
*G06F 21/54* (2013.01)
*G06F 21/55* (2013.01)

(52) U.S. Cl.
CPC ............ *G06F 21/568* (2013.01); *G06F 21/54* (2013.01); *G06F 21/556* (2013.01)

(58) Field of Classification Search
USPC .......................................................... 726/24
See application file for complete search history.

(56) References Cited

U.S. PATENT DOCUMENTS

| | | | | |
|---|---|---|---|---|
| 2007/0015490 A1* | 1/2007 | Munje | ..................... | H04M 1/66 455/410 |
| 2007/0180520 A1* | 8/2007 | Horne | ..................... | G06F 21/83 726/22 |
| 2009/0070687 A1* | 3/2009 | Mazzaferri | ............. | G06F 9/542 715/751 |
| 2009/0165136 A1* | 6/2009 | Obrecht | ................ | G06F 21/566 726/24 |
| 2012/0284297 A1* | 11/2012 | Aguera-Arcas | ..... | G06F 3/03547 707/769 |
| 2015/0106614 A1* | 4/2015 | Lee | ........................ | H04W 12/02 713/150 |
| 2015/0205450 A1* | 7/2015 | Howett | ..................... | G06F 8/38 715/747 |
| 2017/0289181 A1* | 10/2017 | Wang | ................... | G06Q 20/356 |

(Continued)

OTHER PUBLICATIONS

Lu et al, BLADE: An Attack-Agnostic Approach for Preventing Drive-By Malware Infections, Oct. 4, 2010, Proceedings of the 17th ACM conference on Computer and communications security, 1-11 (Year: 2010).*

(Continued)

*Primary Examiner* — Sakinah White Taylor
(74) *Attorney, Agent, or Firm* — FisherBroyles, LLP

(57) ABSTRACT

The disclosed computer-implemented method for mitigating stalkerware by rendering it useless is performed, at least in part, by a computing device comprising at least one processor. The method includes detecting, by the at least one processor in accordance with a security configuration of the computing device, a stalkerware application running in a foreground of the computing device. The method also includes overlaying, by the at least one processor in accordance with the security configuration, the stalkerware application with a window in response to the detecting. The method further includes performing a security action by intercepting one or more user inputs to the stalkerware application via the window, thereby preventing user configuration of the stalkerware application. Various other methods, systems, and computer-readable media are also disclosed.

20 Claims, 7 Drawing Sheets

(56) References Cited

U.S. PATENT DOCUMENTS

2018/0285568 A1* 10/2018 Finger .................. G06F 9/4406
2019/0171808 A1*  6/2019 Ho ........................ G06F 21/31

OTHER PUBLICATIONS

Ulqinaku et al, Using Hover to Compromise the Confidentiality of User Input on Android, Jul. 18, 2017, WiSec '17: Proceedings of the 10th ACM Conference on Security and Privacy in Wireless and Mobile Networks, 12-22 (Year: 2017).*

Chen et al, Android UI Deception Revisited: Attacks and Defenses, Research Gate/Conference: International Conference on Financial Cryptography and Data Security, 1-19 (Year: 2017).*

* cited by examiner

SYSTEMS AND METHODS TO MITIGATE STALKERWARE BY RENDERING IT USELESS

BACKGROUND

Interpersonal attacks result in victims being abused, harassed, or stalked by others, often via technology. Stalkerware applications are often used for such attacks. Stalkerware is a term generally used to refer to software that may be used for stalking, which can include commercial spyware intended for stalking, but can also include legitimate commercial monitoring products when they are misused for stalking. Such legitimate commercial monitoring products are often intended for use by employers or parents to monitor use of electronic devices by others (e.g., employees, contractors, children, etc.). However, these applications may be misused by spouses, intimate partners, etc. for stalking purposes.

Stalkerware typically has certain functionality that requires a particular structure of the stalkerware application program. This functionality may include surveillance functions such as key logging, making screenshots, monitoring of Internet activity, recording of location, and recording of audio and video. Stalkerware functionality may additionally include an ability to work in a stealth mode, such that the user is not notified about being monitored. Stalkerware applications thus may not be visible in the list of installed programs, and the running application is typically disguised as system processes or utility programs. The program structure exhibited by a stalkerware application programming is observable, thus making it possible for security software to detect stalkerware.

In case of mobile applications, a stalkerware application typically is installed from resources other than official app stores. The software manufacturer often positions its monitoring product as a means of tracking an intimate partner or a tool for parental monitoring, while, in fact, anyone can use the stalkerware application to access another person's phone, determine their GPS location, read private messages, see and hear through cameras and microphones, etc. Correct installation and/or operation of the stalkerware application on a computing device often requires disabling anti-virus protection and/or the built-in protection in the operating system of the computing device. When security software of a computing device under control of an attacker detects installation and/or configuration of stalkerware on the device, issuing a notification of the stalkerware detection may result in informing the attacker of the existence of the security software, without effectively notifying the user of the device about the stalkerware detection. The present disclosure, therefore, identifies and addresses a need for systems and methods to mitigate stalkerware.

SUMMARY

As will be described in greater detail below, the present disclosure describes various systems and methods for mitigating stalkerware by rendering it useless.

In one example, a computer-implemented method of mitigating stalkerware by rendering it useless is performed, at least in part, by a computing device comprising at least one processor. The method includes detecting, by the at least one processor in accordance with a security configuration of the computing device, a stalkerware application running in a foreground of the computing device. The method also includes overlaying, by the at least one processor in accordance with the security configuration, the stalkerware application with a window in response to the detecting. The method further includes performing a security action by intercepting one or more user inputs to the stalkerware application via the window, thereby preventing user configuration of the stalkerware application.

In some embodiments, overlaying the stalkerware application with the window includes overlaying an entirety of the stalkerware application with the window. In this case, performing the security action includes intercepting all user inputs to the stalkerware application via the window. In some of these embodiments, overlaying the entirety of the stalkerware application includes overlaying the stalkerware application with a transparent window having a same size and shape as the stalkerware application, thereby avoiding interception of other user inputs to the computing device.

In various embodiments, additional features of the method may be implemented. For example, overlaying the stalkerware application with the window may include overlaying the stalkerware application with an at least partly transparent window. Additionally, the method may include establishing the security configuration in a physical memory of the computing device. Such establishment may extend accessibility services of the computing device to detect the stalkerware application running in the foreground of the computing device and to overlay the stalkerware application with the window. Alternatively or additionally, such establishment may cause the security configuration to call an application programming interface to detect the stalkerware application running in the foreground of the computing device and to overlay the stalkerware application with the window. Also, such establishment may cause the security configuration to be installed, by the at least one processor, with system permissions during initial configuration of the computing device. Alternatively or additionally, such establishment may cause the security configuration to be installed, by the at least one processor, with allowed access to application usages. Further, the method may include issuing, by the at least one processor to a user of the computing device, a notification about the stalkerware application. As will be readily apparent to the skilled person, the above features may be combined in numerous ways, resulting in additional embodiments.

In another example, a system for mitigating stalkerware by rendering it useless includes at least one physical processor and a physical memory comprising computer-executable instructions that, when executed by the physical processor, cause the at least one processor to perform various functions. For example, the instructions may cause the at least one processor to perform detecting, by the at least one processor in accordance with a security configuration of the computing device, a stalkerware application running in a foreground of the computing device. Additionally, the instructions may cause the at least one physical processor to perform overlaying, by the at least one processor in accordance with the security configuration, the stalkerware application with a window in response to the detecting. Further, the instructions may cause the at least one processor to perform a security action by intercepting one or more user inputs to the stalkerware application via the window, thereby preventing user configuration of the stalkerware application.

In some embodiments, overlaying the stalkerware application with the window includes overlaying an entirety of the stalkerware application with the window. In this case, performing the security action includes intercepting all user inputs to the stalkerware application via the window. In some of these embodiments, overlaying the entirety of the stalkerware application includes overlaying the stalkerware application with a transparent window having a same size and shape, as the stalkerware application, thereby avoiding interception of other user inputs to the computing device.

In various embodiments, additional features of the system may be implemented. For example, overlaying the stalkerware application with the window may include overlaying the stalkerware application with an at least partly transparent window. Additionally, the method may include establishing the security configuration in a physical memory of the computing device. Such establishment may extend accessibility services of the computing device to detect the stalkerware application running in the foreground of the computing device and to overlay the stalkerware application with the window. Alternatively or additionally, such establishment may cause security configuration to call an application programming interface to detect the stalkerware application running in the foreground of the computing device and to overlay the stalkerware application with the window. Alternatively or additionally, such establishment may cause the security configuration to be installed, by the at least one processor, with system permissions during initial configuration of the computing device. Alternatively or additionally, such establishment may cause the security configuration to be installed, by the at least one processor, with allowed access to application usages. Further, the method may include issuing, by the at least one processor to a user of the computing device, a notification about the stalkerware application. As will be readily apparent to the skilled person, the above features may be combined in numerous ways, resulting in additional embodiments.

In another example, a non-transitory computer-readable medium comprises one or more computer-executable instructions that, when executed by at least one processor of a computing device, cause the computing device to perform various functions. For example, the instructions may cause the computing device to perform detecting, by the at least one processor in accordance with a security configuration of the computing device, a stalkerware application running in a foreground of the computing device. Additionally, the instructions may cause the at least one processor to perform overlaying, by the at least one processor in accordance with the security configuration, the stalkerware application with a window in response to the detecting. Also, the instructions may cause the computing device to intercept one or more user inputs to the stalkerware application via the window, thereby preventing user configuration of the stalkerware application.

In some embodiments, overlaying the stalkerware application with the window includes overlaying an entirety of the stalkerware application with the window. In this case, the security action may include intercepting all user inputs to the stalkerware application via the window.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
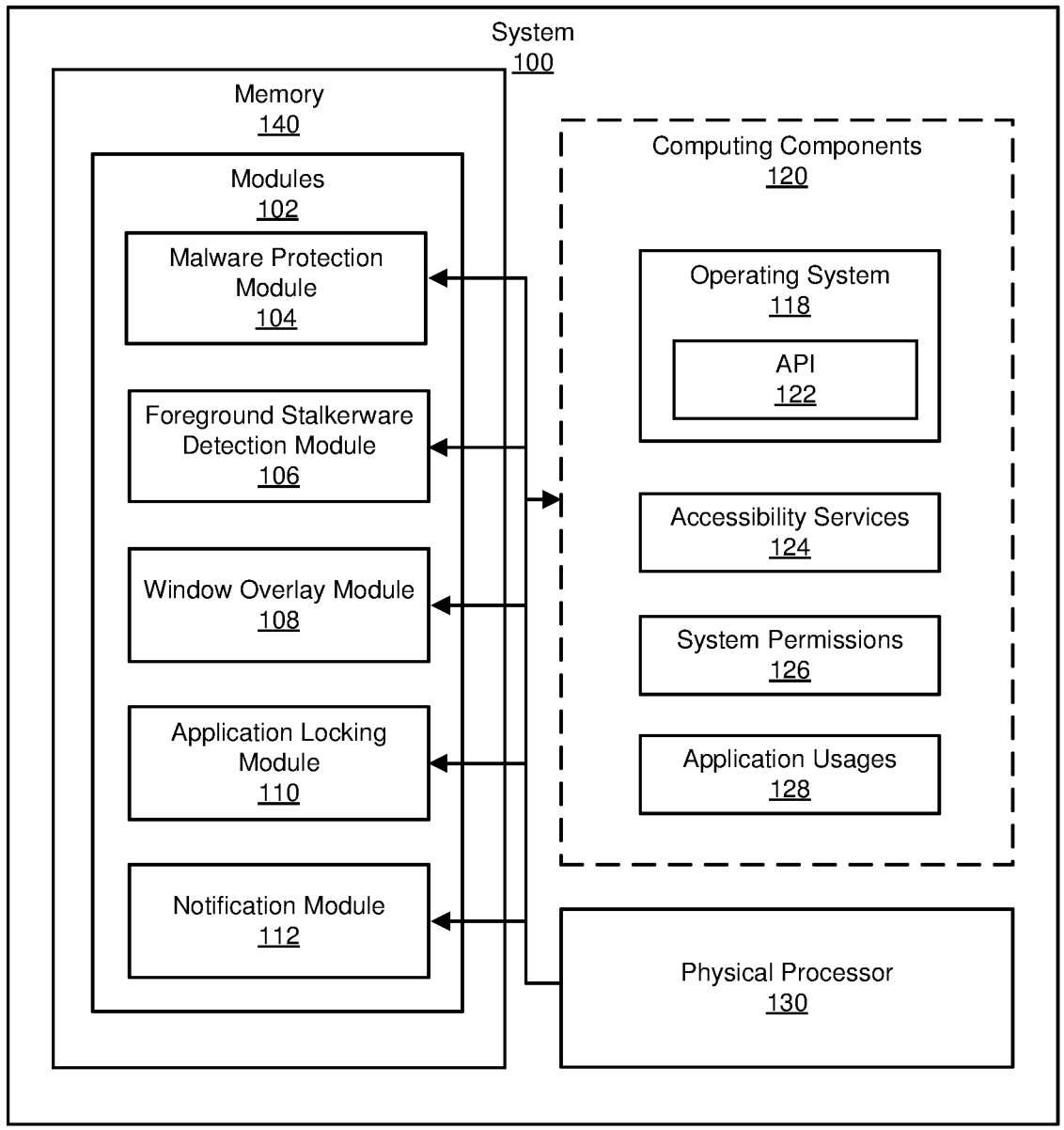
FIG. 1 is a block diagram of an example system for mitigating stalkerware by rendering it useless in accordance with the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for mitigating stalkerware by rendering it useless. As explained in greater detail below, by detecting a stalkerware application running in a foreground of a computing device and overlaying the stalkerware application with a window in response to the detecting, user configuration of the stalkerware application may be prevented by intercepting one or more user inputs to the stalkerware application. A computer foreground or background refers to a priority assigned to programs running in a multitasking environment. The foreground contains the applications the user is working on, and the background contains the applications that are behind the scenes, such as certain operating system functions, printing a document or accessing a network. In order for a stalkerware application to perform the stalkerware functionality it must first be configured, and the stalkerware application must be run in the foreground of the computing device in order for the attacker to configure the stalkerware application.

Without being configured, the stalkerware application is unable to function. When a transparent screen is rendered to overlay the stalkerware application whenever it is running in the foreground, and when notification of detection of the stalkerware is delayed (e.g., for an hour or more), the stalkerware application merely appears to be unresponsive to user input when it is first launched for configuration. As a result, an unsophisticated attacker may not realize that a security measure is intercepting user input to the stalkerware application. In this case, the attacker may conclude that the stalkerware application is broken and cease any further attempts to configure it. Further, a sophisticated attacker who is aware of the security measure may be prevented from accessing system settings and/or uninstalling the security software of the device by an application locking software that requires credentials of an authorized user to access these functions of the device. Accordingly, even if a sophisticated attacker has a password and/or biometric information of an authorized user to unlock the device, additional security credentials that are not the same as those required to unlock the device may be required to thwart the security measure that prevents configuration of the stalkerware application. Yet, an authorized user (e.g., parent, employer, etc.) is still able to successfully configure monitoring software for legitimate tracking purposes because the authorized user has the additional security credentials necessary to disable the security measure (e.g., in system settings).

In addition, the systems and methods described herein may improve the functioning of a computing device by rendering useless potentially malicious stalkerware and thus reducing the computing device's likelihood of infection. These systems and methods may also improve the field of heuristic-based computer security and/or enterprise-level security by preventing security breaches and industrial espionage that can expose personal information and intellectual property, such as trade secrets.

Figure 2:
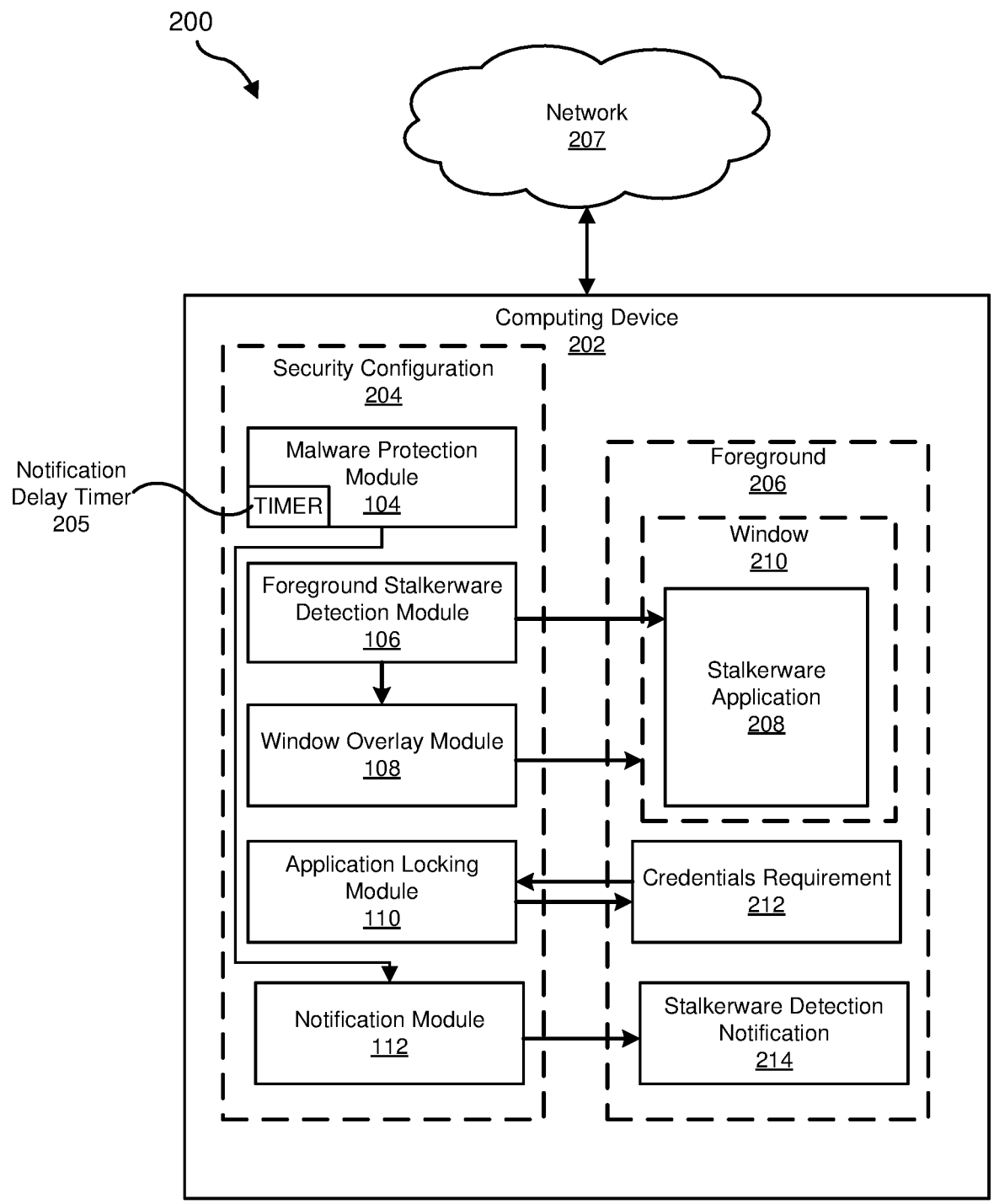
FIG. 2 is a block diagram of an additional example system for mitigating stalkerware by rendering it useless in accordance with the present disclosure.

The following will provide, with reference to FIGS. 1-2, detailed descriptions of example systems for mitigating stalkerware by rendering it useless. Detailed descriptions of corresponding computer-implemented methods will also be provided in connection with FIGS. 3-4. An example of stalkerware mitigation will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for mitigating stalkerware by rendering it useless. As illustrated in this figure, example system 100 may include one or more modules 102 for performing one or more tasks. As will be explained in greater detail below, modules 102 may include a malware protection module 104, a foreground stalkerware detection module 106, a window overlay module 108, an application locking module 110, and a notification module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate mitigating stalkerware by rendering it useless. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more computing components 120. Computing components 120 generally represents any type or form of hardware, software, or combination thereof that provides features and functionality common to computing devices. In one example, computing components may include operating system software, data, and/or user interface features, such as a keyboard, touchpad, touchscreen, and/or mouse of a desktop or laptop computer, touchscreens and buttons of a mobile device (e.g., tablet, smartphone), etc. Examples of computing components include, without limitation, an operating system 118 having an application programming interface (API) 122, accessibility services 124, system permission 126, and application usages 128. Operating system 118 may be software that supports basic functions of a computing device, such as scheduling tasks, executing applications, and controlling peripherals. API 122 may be an interface or communication protocol between different parts of a computer program intended to simplify the implementation and maintenance of software. An API may be for a web-based system, operating system, database system, computer hardware, or software library. Accessibility services 124 may be an application that provides user interface enhancements to assist users with disabilities, or who may temporarily be unable to fully interact with a device. Some operating systems (e.g., Android) may allow developers to define customized accessibility service functionality for their applications by extending accessibility services 124 of the computing device. System permissions 126 may be an application that selectively grants other applications permissions to access specific features, hardware, or data of the computing device. Application usages 128 may allow an application to manage and track usage of other applications running on the computing device. The application usage 128 functionality can include maintaining an application usage history, a phone history, an activity history, a notification history, and a battery history. The application usage 128 functionality may also include providing information such as an over-use reminder and most used applications, tracking and notifying application installations, and managing applications. The application management functionality may include sorting applications by various options and uninstalling applications.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a network 207. In one example, all or a portion of the functionality of modules 102 may be performed by computing device 202 and/or any other suitable computing system. As will be described in greater detail below, one or more of modules 102 from FIG. 1 may, when executed by at least one processor 130 of computing device 202, enable computing device 202 to mitigate stalkerware by rendering it useless. For example, and as will be described in greater detail below, one or more of modules 102, such as foreground stalkerware detection module 106, may cause computing device 202 to detect, by the at least one processor 130 in accordance with a security configuration 204 of the computing device, a stalkerware application 208 running in a foreground 206 of the computing device. Additionally, the one or more of modules 102, such as window overlay module 108, may cause computing device 202 to overlay, by the at least one processor 130 in accordance with the security configuration 204, the stalkerware application 208 with a window 210 in response to the detecting. As a result, computing device 202 performs a security action by intercepting one or more user inputs to the stalkerware application 208 via the window, thereby preventing user configuration of the stalkerware application 208.

In some embodiments, overlaying the stalkerware application 208 with the window 210 includes overlaying an entirety of the stalkerware application 208 with the window 210. As a result, the security action performed by the computing device includes intercepting all user inputs to the stalkerware application 208 via the window. In some of these embodiments, overlaying the entirety of the stalkerware application 208 includes overlaying the stalkerware application 208 with a transparent window 210 having a same size and shape as the stalkerware application 208, thereby avoiding interception of other user inputs to the computing device 202.

In various embodiments, additional features of the system 200 may be implemented. For example, the security configuration 204 may extend accessibility services 124 of the computing device to detect the stalkerware application 208 running in the foreground 206 of the computing device 202 and to overlay the stalkerware application 208 with the window 210. Alternatively or additionally, the security configuration 204 may use an API 122 to detect the stalkerware application 208 running in the foreground 206 of the computing device 202 and to overlay the stalkerware application 208 with the window 210. Also, the security configuration 204 may be installed, by the at least one processor 130, with system permissions 126 and/or with allowed access to application usages 128.

Malware protection module 104 may detect the stalkerware application 208 even before it is run in the foreground 206 of the computing device and activate a notification delay timer 205 in response to detecting the stalkerware application 208. This detection may be based on a structure of the stalkerware application 208 program as will be readily apparent to the skilled person. Thereafter, the security configuration 204 is aware of the stalkerware application, so foreground stalkerware detection module 106 merely detects when the stalkerware application 208 is running in the foreground 206 and does not need to analyze the structure of the stalkerware application 208 program to determine whether it is stalkerware. Notification delay timer 205 avoids alerting the attacker to the fact that the stalkerware has been detected by the security configuration 204, and thus avoids notifying the attacker that the security configuration 204 needs to be disabled in order for an authorized user to remain uninformed of the stalkerware application 208 when it is running in a background of the computing device 202.

Application locking module 110 may be a program (e.g., Applock) that can lock any application (e.g., settings of the computing device, malware protection module 104, etc.), and thus prevent an attacker from disabling the security configuration. An authorized user, however, may unlock such applications by providing credentials to a user interface input component of a displayed credentials requirement 212, and thereafter turn on and off the stalkerware mitigation features as preferred. This capability advantageously enables an authorized user, such as a parent or employer, to successfully configure monitoring software for legitimate tracking purposes, while preventing attackers from doing so by locking the application(s) that allow the stalkerware mitigation features to be turned on and off.

Notification module 112 may perform issuing, by the at least one processor 130 to a user of the computing device 202, a notification about the stalkerware application 208. This stalkerware detection notification 214 may be issued following a delay having a duration of one hour or more. For example, the notification module 112 may issue the stalkerware detection notification 214 upon expiration of the notification delay timer 205. This delay in notifying the user avoids notifying the attacker that the stalkerware 208 has been detected. Combined with the transparent window that makes the stalkerware application 208 appear to be broken, the delay in the notification avoids encouraging the attacker to conceal the efforts to install and configure the stalkerware application 208 on the computing device 202. As a result, the authorized user of the device may be successfully notified of the attempted attack and take appropriate measures, while the mitigation features have prevented the stalkerware application 208 from accessing and transmitting any personal information or user activity during the notification delay.

Computing device 202 generally represents any type or form of computing device capable of reading computer-executable instructions. Computing device 202 may be a mobile device (e.g., smartphone). Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), virtual assistant, smart home component, security system component, variations or combinations of one or more of the same, and/or any other suitable computing device.

Network 207 generally represents any medium or architecture capable of facilitating communication or data transfer. In one example, network 207 may facilitate communication or data transfer using wireless and/or wired connections. Examples of network 207 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
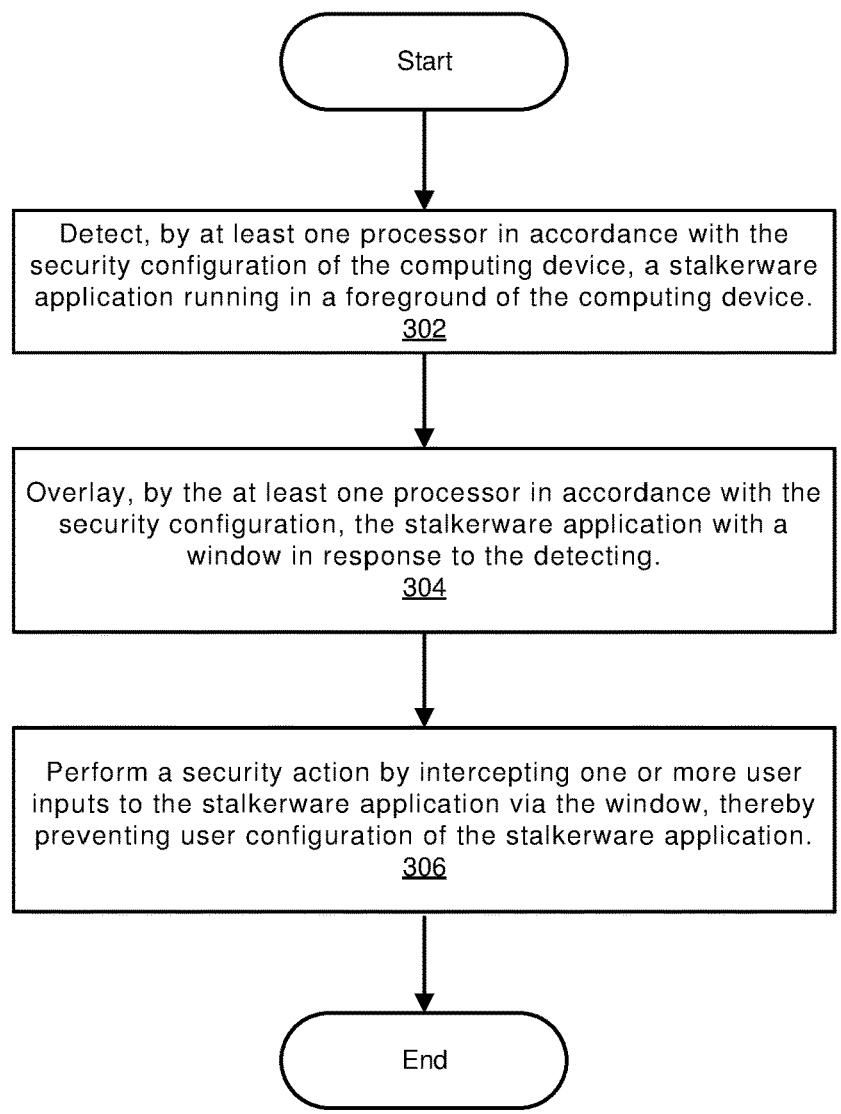
FIG. 3 is a flow diagram of an example method for mitigating stalkerware by rendering it useless in accordance with the present disclosure.

FIG. 3 is a flow diagram of an example computer-implemented method 300 for mitigating stalkerware by rendering it useless. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may perform detecting, by at least one processor in accordance with a security configuration of a computing device, a stalkerware application running in a foreground of the computing device. For example, foreground stalkerware detection module 106 may, as part of computing device 202 in FIG. 2, overlay the stalkerware application with the window. Processing may proceed from step 302 to step 304.

At step 304, the method 300 may include overlaying, by the at least one processor in accordance with the security configuration, the stalkerware application with a window in response to the detecting. For example, window overlay module 108 may, as part of computing device 202 in FIG. 2, overlay the stalkerware application with the window. In some embodiments, overlaying the stalkerware application with the window includes overlaying an entirety of the stalkerware application with the window. In some of these embodiments, overlaying the entirety of the stalkerware application includes overlaying the stalkerware application with a transparent window having a same size and shape as the stalkerware application. Processing may proceed from step 304 to step 306.

At step 306 the method 300 may include performing a security action by intercepting one or more user inputs to the stalkerware application via the window. By intercepting user inputs at step 306, user configuration of the stalkerware application may be prevented. When the window is the same size and shape as the stalkerware application, the computer processor can avoid interception of other user inputs to the computing device.

In various embodiments, additional features of the method may be implemented. For example, overlaying the stalkerware application with the window at step 304 may include overlaying the stalkerware application with an at least partly transparent window. It Such a window may be entirely or completely transparent in some implementations. Additionally, the security configuration may extend accessibility services of the computing device to detect, at step 302, the stalkerware application running in the foreground of the computing device and to overlay, at step 304, the stalkerware application with the window. Alternatively or additionally, the security configuration may use an application programming interface to detect, at step 302, the stalkerware application running in the foreground of the computing device and to overlay, at step 304, the stalkerware application with the window.

Figure 4:
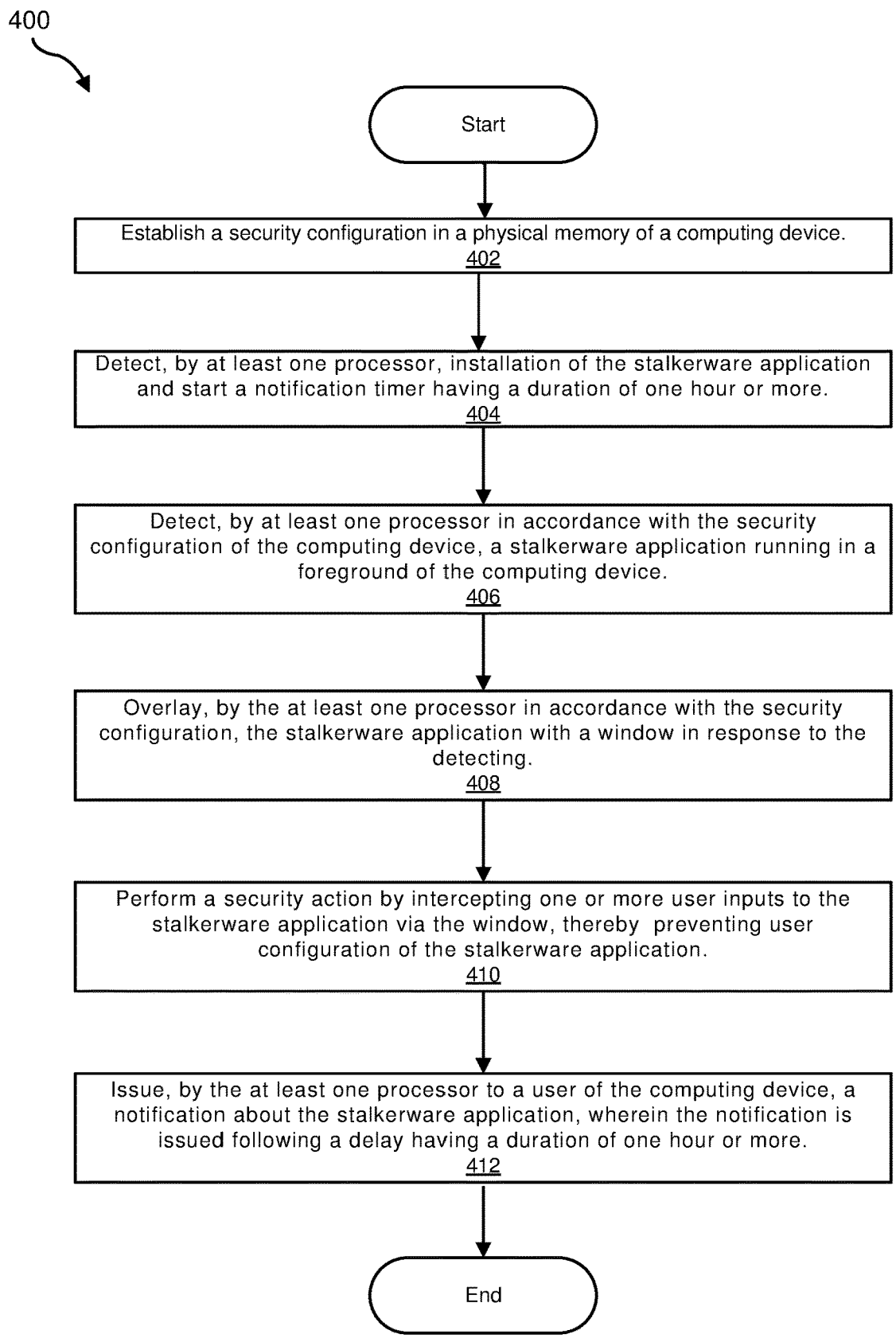
FIG. 4 is a flow diagram of an additional example method for mitigating stalkerware by rendering it useless in accordance with the present disclosure.

FIG. 4 is a flow diagram of an example computer-implemented method 400 that implements the method for mitigating stalkerware by rendering it useless. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may perform establishing a security configuration in a physical memory of a computing device. For example, step 402 may include downloading, installing, and/or configuring the security configuration 204 of FIG. 2 in the memory 140 of FIG. 1. In some embodiments, step 402 may include enabling accessibility services 124 for the security configuration 204, or installing the security configuration 204, by the physical processor 130, with system permissions 126 and/or with allowed access to application usages 128. Processing may proceed from step 402 to step 404.

At step 404, the method 400 may include detecting installation of a stalkerware application and responding to this detection by starting a delayed notification timer having a duration of one hour or more. For example, malware protection module 104, as part of computing device 202 in FIG. 2, may detect the stalkerware based on a structure of the stalkerware application program. Malware protection module 104 may also inform foreground stalkerware detection module 106 that the stalkerware application is stalkerware, and/or may store information in memory 140 indicating that the stalkerware application program has been identified as being stalkerware. Processing may proceed from step 404 to steps 406-410, which have the same functionality as modules 302-306 as described above with reference to FIG. 3. Processing may proceed from step 410 to step 412.

At step 412, the method 400 may include issuing, by the at least one processor to a user of the computing device, a notification about the stalkerware application. This notification may be issued following a delay having a duration of one hour or more. For example, notification module 112, as part of computing device 202 in FIG. 2, may issue the notification upon expiration of the delayed notification timer that was started in step 404. The issued notification may be displayed on an active display of the computing device 202 with a user interface input component with which the user may interact to cause the stalkerware application to be uninstalled.

As explained above in connection with example method 300 in FIG. 3 and method 400 in FIG. 4, when a stalkerware application is installed on a device, it is not the best time to surface that detection and ask the user to uninstall the application (e.g., on platforms where it cannot be uninstalled automatically) as it is very likely that the attacker is the one installing the application. Therefore, surfacing the detection needs to be performed at a later time, and the device needs to prevent the stalkerware from collecting personal information in the meantime. The mitigation features disclosed herein prevent the attacker from configuring the stalkerware (e.g., accept the end user license agreement, grant permissions, provide device identifier to lookup data in the back-end, etc.), thus rendering the stalkerware application useless without raising any suspicion—it appears as if the stalkerware application is broken. The disclosed solution solves the problem by showing a transparent window over the stalkerware application whenever it is in the foreground so that it cannot handle user inputs. The rest of the device functionality remains intact, so that the stalkerware application appears to an attacker to be broken. Without any ability to configure the stalkerware application, the solution renders the stalkerware application useless. On platforms where it is possible to block the installation of the stalkerware application, the disclosed solution still has value in case the attacker is successful in circumventing such security measures and successfully installs the stalkerware application.

Figure 5:
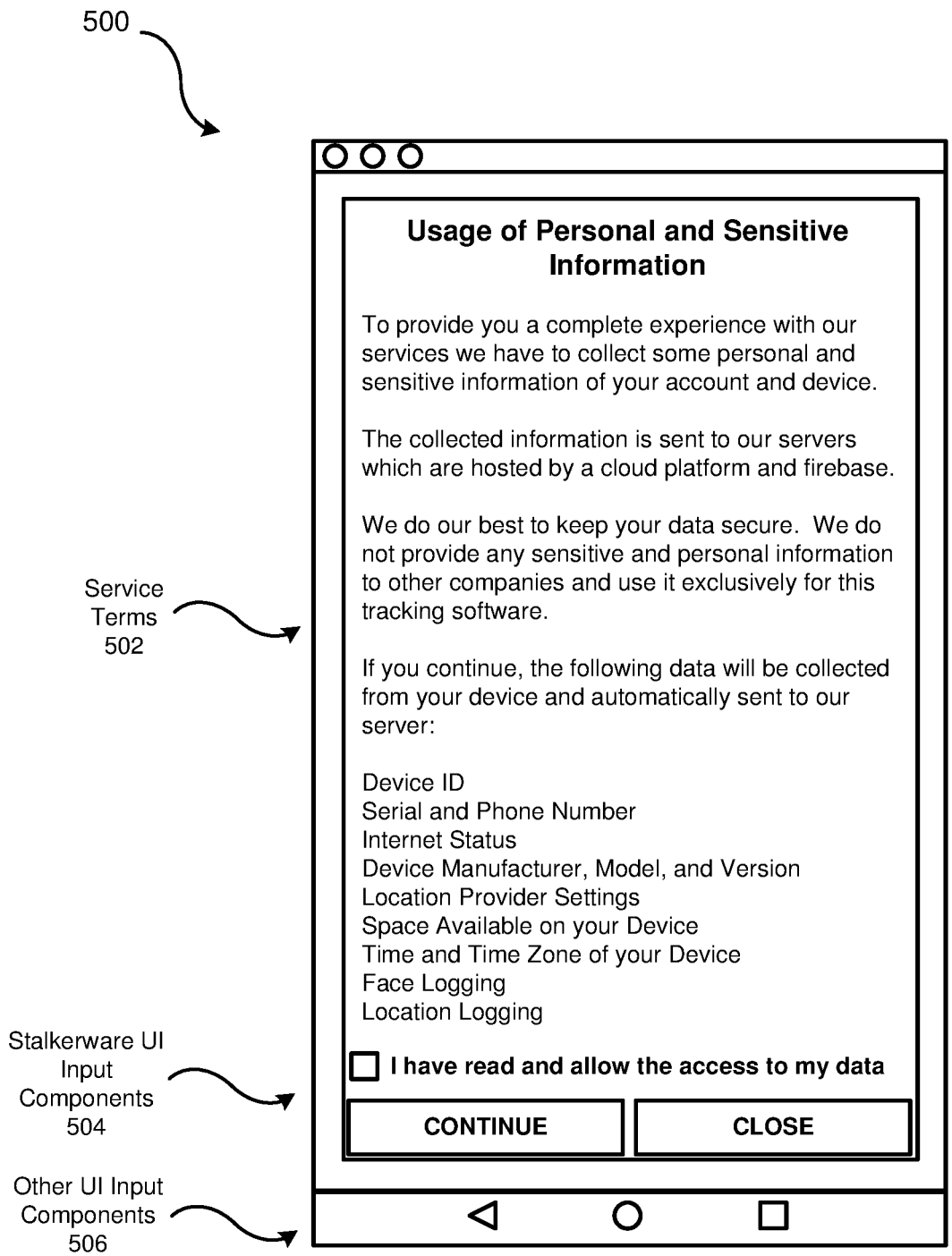
FIG. 5 is a diagram illustrating mitigated stalkerware rendered useless in accordance with the present disclosure.

FIG. 5 illustrates mitigated stalkerware 500 rendered useless in accordance with the present disclosure. The stalkerware 500 is displayed in a foreground for configuration and includes an end user license agreement displaying service terms 502. A transparent window overlays at least a set of stalkerware user interface input components 504 that must receive user inputs to accept the service terms 502 and continue with configuration of the stalkerware application. The transparent window, however, intercepts user inputs to the components 504, and may also intercept attempts to scroll the service terms 502, and/or any other inputs to the mitigated stalkerware 500. Other user interface input components 506, however, are not covered by the transparent window. Thus, it appears to an attacker that the stalkerware application is broken, but that other applications or hardware components of the computing device are still operational.

Figure 6:
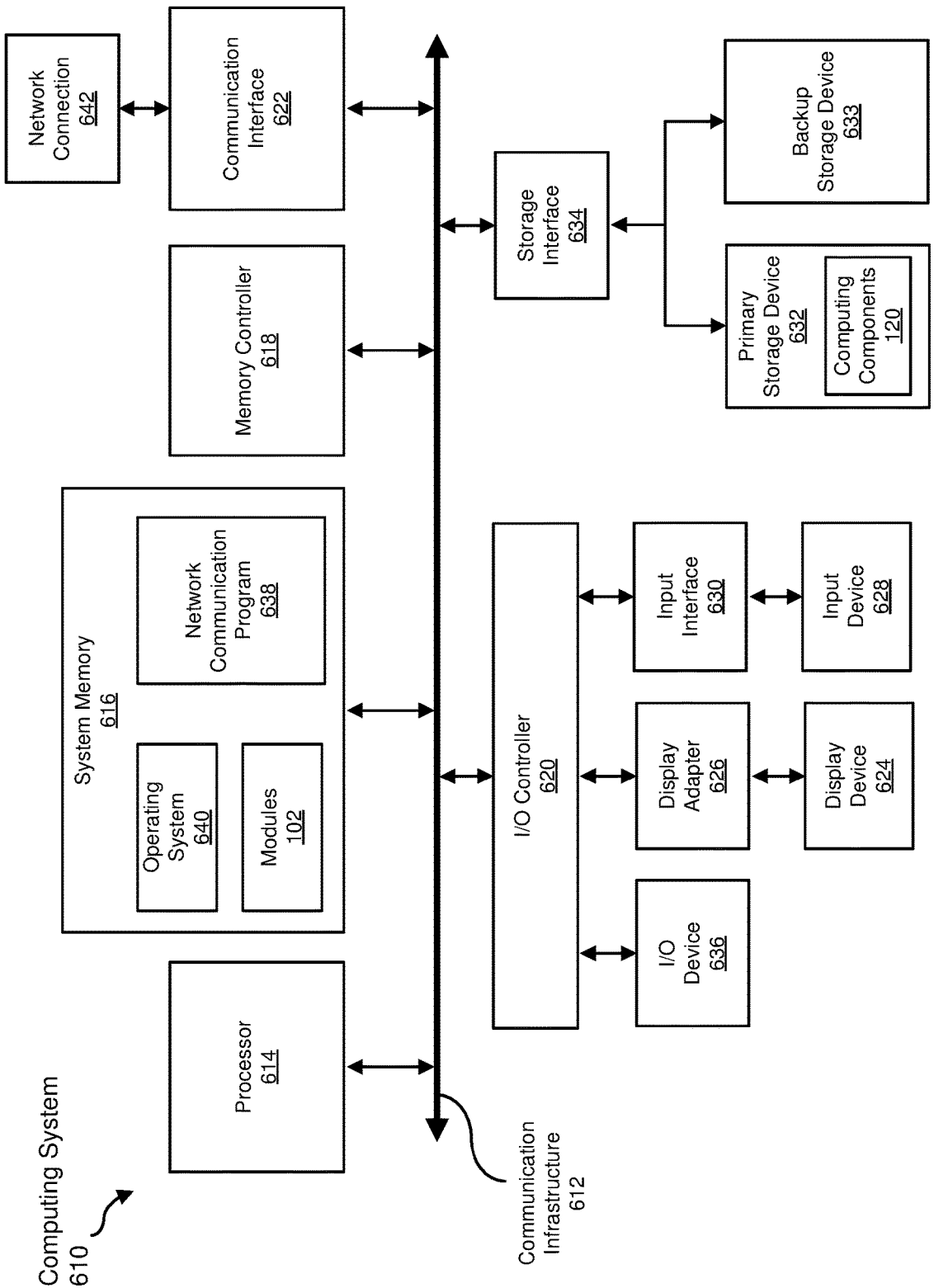
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, computing components 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
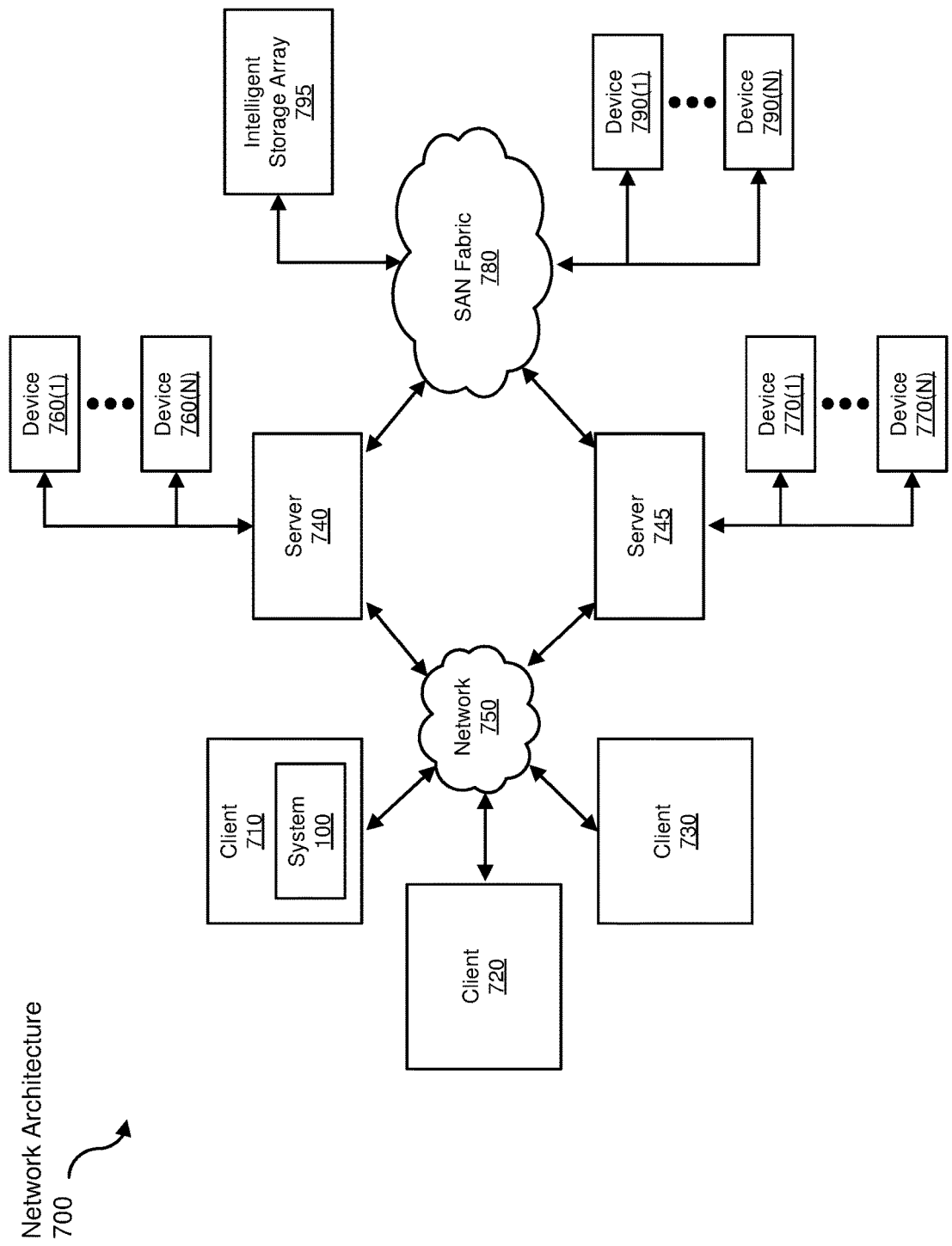
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for mitigating stalkerware by rendering it useless.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method of mitigating stalkerware by rendering it useless, at least a portion of the method being performed by a computing device comprising at least one processor, the method comprising:
    detecting, by the at least one processor in accordance with a security configuration of the computing device, a stalkerware application running in a foreground of the computing device;
    overlaying, by the at least one processor in accordance with the security configuration, the stalkerware application with a window in response to the detecting;
    performing a security action that includes intercepting one or more user inputs to the stalkerware application via the window, thereby preventing user configuration of the stalkerware application, wherein the user configuration of the stalkerware application is required for the stalkerware application to be able to function;
    delaying user notification of the detection of the stalkerware application, thereby causing the stalkerware application to appear to be broken to an attacker who is an unauthorized user attempting to install and configure the stalkerware application on the computing device; and
    requiring, by the at least one processor, additional security credentials of an authorized user of the computing device to thwart the security action that prevents user configuration of the stalkerware application, wherein the additional security credentials are not the same as those required to unlock the computing device.

2. The method of claim 1, wherein overlaying the stalkerware application with the window includes overlaying an entirety of the stalkerware application with the window, wherein performing the security action includes:
intercepting all user inputs to the stalkerware application via the window.

3. The method of claim 2, wherein overlaying the entirety of the stalkerware application includes overlaying the stalkerware application with a transparent window having a same size and shape as the stalkerware application, thereby avoiding interception of one or more other user inputs to the computing device.

4. The method of claim 1, wherein overlaying the stalkerware application with the window includes overlaying the stalkerware application with an at least partially transparent window.

5. The method of claim 1, further comprising:
establishing the security configuration by extending accessibility services of the computing device to detect the stalkerware application running in the foreground of the computing device and to overlay the stalkerware application with the window.

6. The method of claim 1, further comprising:
establishing the security configuration to call an application programming interface of the computing device to detect the stalkerware application running in the foreground of the computing device and to overlay the stalkerware application with the window.

7. The method of claim 1, further comprising:
establishing the security configuration, by the at least one processor, at least in part by installing the security configuration with system permissions during an initial configuration of the computing device.

8. The method of claim 1, further comprising:
establishing the security configuration, by the at least one processor, at least in part by installing the security configuration with allowed access to application usages.

9. The method of claim 1, further comprising issuing, by the at least one processor to a user of the computing device, the user notification about the stalkerware application in response to expiration of a notification delay timer.

10. A system for mitigating stalkerware by rendering it useless, the system comprising:
at least one physical processor;
physical memory comprising computer-executable instructions that, when executed by the physical processor, cause the physical processor to:
perform detecting, by the at least one physical processor in accordance with a security configuration of a computing device, a stalkerware application running in a foreground of the computing device;
perform overlaying, by the at least one physical processor in accordance with the security configuration, the stalkerware application with a window in response to the detecting;
perform a security action by intercepting one or more user inputs to the stalkerware application via the window, thereby preventing user configuration of the stalkerware application, wherein the user configuration of the stalkerware application is required for the stalkerware application to be able to function;
delay user notification of the detection of the stalkerware application, thereby causing the stalkerware application to appear to be broken to an attacker who is an unauthorized user attempting to install and configure the stalkerware application on the computing device; and
require, by the at least one processor, additional security credentials of an authorized user to thwart the security action that prevents user configuration of the stalkerware application, wherein the additional security credentials are not the same as those required to unlock the computing device.

11. The system of claim 10, wherein overlaying the stalkerware application with the window includes overlaying an entirety of the stalkerware application with the window, wherein the instructions cause the physical processor to perform the security action at least in part by:
intercepting all user inputs to the stalkerware application via the window.

12. The system of claim 11, wherein overlaying the entirety of the stalkerware application includes overlaying the stalkerware application with a transparent window having a same size and shape as the stalkerware application, thereby avoiding interception of one or more other user inputs to the computing device.

13. The system of claim 10, wherein overlaying the stalkerware application with the window includes overlaying the stalkerware application with an at least partially transparent window.

14. The system of claim 10, wherein the instructions further cause the at least on physical processor to:
establish the security configuration by extending accessibility services of the computing device to detect the stalkerware application running in the foreground of the computing device and to overlay the stalkerware application with the window.

15. The system of claim 10, wherein the instructions further cause the at least on physical processor to:
establish the security configuration to call an application programming interface to detect the stalkerware application running in the foreground of the computing device and to overlay the stalkerware application with the window.

16. The system of claim 10, wherein the instructions further cause the at least on physical processor to:
establish the security configuration, by the at least one processor, by installing the security configuration with system permissions during an initial configuration of the computing device.

17. The system of claim 10, wherein the instructions further cause the at least on physical processor to:
establish the security configuration, by the at least one processor, at least in part by installing the security configuration with allowed access to application usages.

18. The system of claim 10, wherein the instructions further cause the at least on physical processor to:
issue, by the at least one physical processor to a user of the computing device, the user notification about the stalkerware application in response to expiration of a notification delay timer.

19. A non-transitory computer-readable medium comprising one or more computer-executable instructions that, when executed by at least one processor of a computing device, cause the computing device to:
perform detecting, by the at least one processor in accordance with a security configuration of the computing device, a stalkerware application running in a foreground of the computing device;

perform overlaying, by the at least one processor in accordance with the security configuration, the stalkerware application with a window in response to the detecting;

perform a security action that includes intercepting one or more user inputs to the stalkerware application via the window, thereby preventing user configuration of the stalkerware application, wherein the user configuration of the stalkerware application is required for the stalkerware application to be able to function;

delay user notification of the detection of the stalkerware application, thereby causing the stalkerware application to appear to be broken to an attacker who is an unauthorized user attempting to install and configure the stalkerware application on the computing device; and require, by the at least one processor, additional security credentials of an authorized user of the computing device to thwart the security action that prevents user configuration of the stalkerware application, wherein the additional security credentials are not the same as those required to unlock the computing device.

20. The non-transitory computer-readable medium of claim 19, wherein the instructions cause the computing device to overlay an entirety of the stalkerware application with the window, wherein the instructions cause the computing device to perform the security action at least in part by:

intercepting all user inputs to the stalkerware application via the window.

* * * * *

UNITED STATES PATENT AND TRADEMARK OFFICE
CERTIFICATE OF CORRECTION

PATENT NO. : 11,366,903 B1  
APPLICATION NO. : 16/723556  
DATED : June 21, 2022  
INVENTOR(S) : Savant et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 150 days.

Signed and Sealed this  
Tenth Day of June, 2025

Coke Morgan Stewart  
*Acting Director of the United States Patent and Trademark Office*